United States Patent [19]
Cooper

[11] Patent Number: 4,469,855
[45] Date of Patent: Sep. 4, 1984

[54] ETHYLENE COPOLYMERIZATION USING DILUENT GAS

[75] Inventor: Richard R. Cooper, Wheathampstead, England

[73] Assignee: Imperial Chemical Industries PLC, London, England

[21] Appl. No.: 497,224

[22] Filed: May 23, 1983

[30] Foreign Application Priority Data

Jun. 1, 1982 [GB] United Kingdom ............... 8215861

[51] Int. Cl.$^3$ ............................................. C08F 10/02
[52] U.S. Cl. .................... 526/106; 526/901; 526/90; 526/64; 526/68; 526/123; 526/129
[58] Field of Search ............... 526/901, 90, 106, 123, 526/129, 64, 68

[56] References Cited

U.S. PATENT DOCUMENTS 2,936,303  5/1960  Goins ................................ 260/93.7
4,133,944  1/1979  Cooper et al. ........................ 526/65

FOREIGN PATENT DOCUMENTS 743943  12/1968  Belgium .
1092665  11/1967  United Kingdom .
1246405  9/1971  United Kingdom .

Primary Examiner—Paul R. Michl
Assistant Examiner—A. H. Walker
Attorney, Agent, or Firm—Cushman, Darby & Cushman

[57] ABSTRACT

Ethylene is copolymerized in the gas phase, for example in a fluidized bed, using a gaseous mixture comprising ethylene, at least one olefine monomer containing at least 4 carbon atoms, an inert gaseous diluent and, optionally, hydrogen at a total absolute pressure of at least one MN/m$^2$. The comonomer preferably contains 6 or 8 carbon atoms. The partial pressure of the comonomer may be in the range from 1 kN/m$^2$ up to 550 kN/m$^2$. The inert gaseous diluent typically has a partial pressure of at least 250 kN/m$^2$ and forms 20% molar of the gaseous mixture. The inert gaseous diluent may be nitrogen and is preferably ethane.

10 Claims, 2 Drawing Figures

ETHYLENE COPOLYMERIZATION USING DILUENT GAS

The present invention relates to the copolymerisation of ethylene using a gas phase polymerisation process in which a gaseous monomer mixture is contacted with a solid phase containing a polymerisation catalyst.

Considerable interest is being shown in the polymerisation of ethylene in the gas phase in the essential absence of any liquid medium since such a procedure is believed to offer an operating advantage in that no liquid diluent is used and hence the consequential need to separate the diluent, and possibly purify it before it is re-used, is avoided. There is also considerable interest in the production of copolymers of ethylene using such a process. The comonomers proposed for such processes are the higher olefin monomers such as, for example, butene-1. However, in carrying out such copolymerisation processes, the comonomer used has a relatively high boiling temperature and, since it is necessary to recycle the gas mixture and to cool the gas mixture being recycled, there is a possibility of the comonomer condensing in the cooler parts of the recycle gas loop. Such condensation of the comonomer will give problems in controlling the proportions of comonomer in the circulating gas. If copolymers of low density are to be produced, this requires the comonomer to be used in relatively high proportions relative to the ethylene and hence an appreciable amount of liquid will be produced. Furthermore, since the circulation time of the gas is typically short (of the order of one minute), the liquid produced has to be circulated rapidly. If the polymerisation is being effected in a fluidised bed, the injection of large quantities of liquid into the bed can result in the loss of fluidisation of the bed. To avoid the problems associated with condensation of the comonomer in the recycle gas loop, it is necessary to operate with a low partial pressure of the comonomer and this, in turn, means that the partial pressures of ethylene and hydrogen must also be relatively low if the desired product is to be obtained. The heat removal capacity of the circulating gas is related, inter alia, to the pressure of the gas, and hence the use of a low polymerisation pressure is undesirable since the polymerisation rate is also decreased. Furthermore, the stability of the fluidised bed is reduced when the operating pressure is low.

According to the present invention there is provided a process for the preparation of a copolymer of ethylene which comprises contacting, in a polymerisation vessel, a gaseous mixture comprising ethylene, at least one olefin comonomer containing at least 4 carbon atoms, at least one inert gaseous diluent and optionally hydrogen with a solid medium containing an olefin polymerisation catalyst wherein, within the polymerisation vessel, the partial pressure of the comonomer or comonomers containing at least 4 carbon atoms is such as to be greater than the saturated vapour pressure of the comonomer or comonomers at 10° C. and less than the saturated vapour pressure of the comonomer or comonomers at 60° C., the partial pressure of the ethylene is at least twice and not more than 1000 times the partial pressure of the comonomer or comonomers, the partial pressure of the optional hydrogen is up to 1000 times the partial pressure of the comonomer or comonomers, and the inert gaseous diluent is present in an amount to give a total pressure of at least one $MN/m^2$ absolute.

Although more than one comonomer may be used, it is generally preferred to use only one comonomer. The comonomer typically contains up to 10 carbon atoms and it is preferred that the comonomer contains at least 5 carbon atoms especially 6 or 8 carbon atoms, for example, hexene-1, 4-methylpentene-1 or octene-1. The partial pressure of the comonomer or comonomers will be dependent on the particular comonomer or comonomers and will be less for those comonomers having the higher boiling temperatures. The partial pressure of the comonomer, or comonomers, is preferably greater than the saturated vapour pressure of the comonomer, or comonomers, at 20° C. It is preferred that the partial pressure of the comonomer or comonomers, is less than the saturated vapour pressure of the comonomer or comonomers, at 50° C. and, when the comonomer is hexene-1 or 4-methylpentene-1, it is particularly preferred that the partial pressure of the comonomer is less than the saturated vapour pressure of the comonomer at 40° C. The partial pressure of the comonomer, or comonomers, is typically in the range from 1 $kN/m^2$ up to 550 $kN/m^2$ especially up to 280 $kN/m^2$.

For convenience the term "comonomer" is used hereafter to include not only a single comonomer but also a mixture of comonomers.

The partial pressure of ethylene is dependent on the partial pressure of the comonomer and is also dependent on the type of copolymer which it is desired to produce. To produce a copolymer of relatively low density such as below 930 $kg/m^3$ which will contain a relatively high proportion of the comonomer, for example, at least 6% by weight of comonomer, it is desirable that the ratio of ethylene partial pressure to comonomer partial pressure is relatively low, typically less than 100. However, to produce a copolymer of higher density, which will contain a lesser proportion of comonomer, the ratio of ethylene partial pressure to comonomer partial pressure will be higher and may be considerably in excess of 100. It will be appreciated that the relative proportions of ethylene and comonomer which are required to achieve a copolymer having a given density will be dependant on other factors, including the particular comonomer and also the polymerisation catalyst.

Hydrogen may be present as an optional component of the gaseous mixture. The partial pressure of hydrogen, when present, is dependent upon the molecular weight, for example as measured by the melt flow index, of the copolymer to be produced. The preferred melt flow index of the copolymer to be produced is in the range from 0.1 up to 100, especially 0.4 to 60, measured by ASTM Test Method D 1238-70 (at 190° C. using a load of 2.16 kg). To obtain a melt flow index in the desired range, the partial pressure of hydrogen can be adjusted in the manner known in the art. The partial pressure of hydrogen is typically from 0.5 up to 50 times the partial pressure of the comonomer.

The inert gaseous diluent is preferably a material which remains gaseous under all the conditions of temperature and pressure which exist within the recycle loop through which the gaseous mixture is circulated. The inert gaseous diluent is preferably a material having a low liquefaction temperature, for example below $-50°$ C. at atmospheric pressure (about 100 $kN/m^2$). A wide range of inert gaseous materials may be used, for example, helium or argon, but we prefer to use nitrogen or especially ethane. The inert gaseous diluent is present in an amount to give a total pressure which is at least one $MN/m^2$. absolute, and it is preferred that the partial pressure of the inert gaseous diluent is at least 350 kN/m$^2$.

The inert gaseous diluent generally forms at least 20% by moles, and preferably at least 40% by moles, of the gaseous mixture. In general the amount of the inert gaseous diluent does not exceed 85% by moles, and preferably does not exceed 75% by moles, of the gaseous mixture.

Thus, according to a preferred aspect of the present invention the gaseous mixture comprises ethylene; hexene-1, 4-methylpentene-1 or octene-1; hydrogen and ethane.

The total pressure of the gaseous mixture is preferably at least 1.30 MN/m$^2$ absolute and particularly at least 1.45 MN/m$^2$ absolute. The total pressure of the gaseous mixture is preferably not more than 5 MN/m$^2$ absolute, particularly not more than 3 MN/m$^2$ absolute.

Using hexene-1 or 4-methylpentene-1 to produce a copolymer in accordance with the present invention, the gaseous mixture preferably is such that the partial pressure of hexene-1 or 4-methylpentene-1 is in the range from 20 up to 150 kN/m$^2$, the partial pressure of hydrogen is in the range from 30 up to 180 kN/m$^2$, the partial pressure of ethylene is in the range from 250 up to 750 kN/m$^2$ and the partial pressure of the inert gaseous diluent is sufficient to give a total pressure of at least 1.30 MN/m$^2$ absolute. The partial pressure of the inert gaseous diluent is generally in the range from 250 kN/m$^2$ up to 4.7 MN/m$^2$, and especially in the range from 500 kN/m$^2$ up to 2.7 MN/m$^2$.

Using octene-1 as the comonomer, the gaseous mixture preferably is such that the partial pressure of octene-1 is in the range from 2 up to 12 kN/m$^2$, the partial pressure of hydrogen is in the range from 60 up to 150 kN/m$^2$, the partial pressure of ethylene is in the range from 250 up to 600 kN/m$^2$ and the partial pressure of the inert gaseous diluent is sufficient to give a total pressure of at least 1.30 MN/m$^2$ absolute. The partial pressure of the inert gaseous diluent is generally in the range from 0.55 up to 4.7 MN/m$^2$, and especially in the range from 0.8 up to 2.7 MN/m$^2$.

Using the gaseous mixture as herein defined, the polymerisation is carried out using any technique previously described for the polymerisation of ethylene in the gas phase. Thus, polymerisation can be effected using any technique suitable for effecting a gas-solid reaction such as a fluidised bed reactor system, a stirred bed reactor system or a ribbon blender type of reactor. More specifically, polymerisation may be effected using a fluidised bed reactor, for example, as described in British Patent Specification Nos. 808 361 and 954 078 or U.S. patent specification No. 3,023,203.

The polymerisation is preferably effected at a temperature of at least 60° C. and not more than 110° C. especially a temperature in the range 70° up to 100° C.

The gaseous mixture is withdrawn from the polymerisation vessel, conveniently is passed through a recycle gas loop which includes cooling means and then returned to the polymerisation vessel. The cooling means is arranged to cool the gas mixture to a temperature which preferably is not lower than the dew point temperature of the circulating gas. However, if the proportion of condensable gas is low, that is, less than 1% molar of the gaseous mixture, cooling below the dew point temperature may be tolerated. Any liquid which is condensed out under these conditions can then be passed to the polymerisation vessel and reintroduced as a liquid or gas. When using higher boiling olefin monomers such as octene-1 as the olefin comonomer, the proportion of such a monomer is generally sufficiently low that cooling below the dew point temperature can be effected in the recycle gas loop without giving rise to operating problems.

The composition of the gaseous mixture is preferably monitored by taking samples from the recycle gas loop, at a point before the cooling means. The monitoring can be effected by any suitable means, for example by gas chromatography. Make-up gases may be added to the recycle gas loop in order to maintain the desired gas composition. If desired, the quantities of the various make-up gases added may be controlled automatically in response to the measured composition of the gaseous mixture but it will be appreciated that the quantities of the make-up gases may be controlled manually in appropriate situations. To avoid condensation of the make-up comonomer, this may be introduced directly into the polymerisation vessel. The make-up comonomer may be introduced into the polymerisation vessel as a liquid, and this liquid can be mixed with any quantities of comonomer which have been condensed in the recycle gas loop. The conditions within the polymerisation vessel are such that any liquid which is added evaporates rapidly whereby polymerisation occurs in the essential absence of a separate liquid phase.

BRIEF DESCRIPTION OF THE DRAWINGS

The accompanying drawings are flow diagrams of apparatus which may be used to effect the process of the present invention, wherein.

The polymerisation is effected using any catalyst system known in the art which is suitable for the copolymerisation of ethylene with higher olefin comonomers. Such catalyst systems include the so-called Ziegler catalyst systems which comprise a transition metal compound together with an organic compound of a non-transition metal which is typically aluminium. Alternatively, polymerisation catalysts based on the oxides of chromium supported on a suitable support material such as silica may be used. Other catalyst systems which may be used include the organic compounds of the transition metals, in particular, chromium or zirconium, for example, chromium allyl compounds, chromium cyclopentadienyl compounds or zirconium tetrabenzyl and derivatives thereof, on a suitable support material such as silica or alumina. Other catalyst systems are the products obtained by reacting an organic magnesium compound with a suitable support material and subsequently treating this with an optional halogen-containing compound, an optional Lewis Base compound and with a transition metal compound. A catalyst of the latter type may be obtained by reacting a magnesium dialkyl such as magnesium dibutyl with a solid inorganic oxide such as silica, treating this product with a chlorine-containing compound such as carbon tetrachloride or silicon tetrachloride, optionally treating this product with a Lewis Base compound such as ethyl benzoate and thereafter treating that product with a titanium compound such as titanium tetrachloride. Catalyst systems of this type are disclosed in European patent application publication Nos. 14523, 14524, 32308 and 32309. Other suitable catalyst systems are those which include as one component the product of contacting a transition metal compound, particularly titanium tetrachloride, with a magnesium halide, particularly magnesium chloride. Catalysts of this type are described, inter alia, in British patent specification Nos. 1 527 736 and 1 559 194. If desired, the particle-form of the catalyst may be modified, for example by spray-drying using the process of European patent application publication No. 37182.

The products obtained by the process of the present invention are ethylene copolymers which typically contain between 2% and 15% by weight of comonomer especially between 3% and 12% by weight of comonomer. The polymers typically have a density in the range 910 up to 940 Kg/cm$^2$ and especially in the range 915 up to 935 Kg/cm$^2$. The molecular weight of the polymer as measured by the melt flow index at a temperature 190° C. and a load of 2.16 Kg, is typically in the range 0.1 up to 100 and especially from 0.4 up to 60. Depending on the particular catalyst system used and, to a lesser extent, on the reaction conditions, the molecular weight distribution of the polymer may be varied quite widely.

Figure 1:
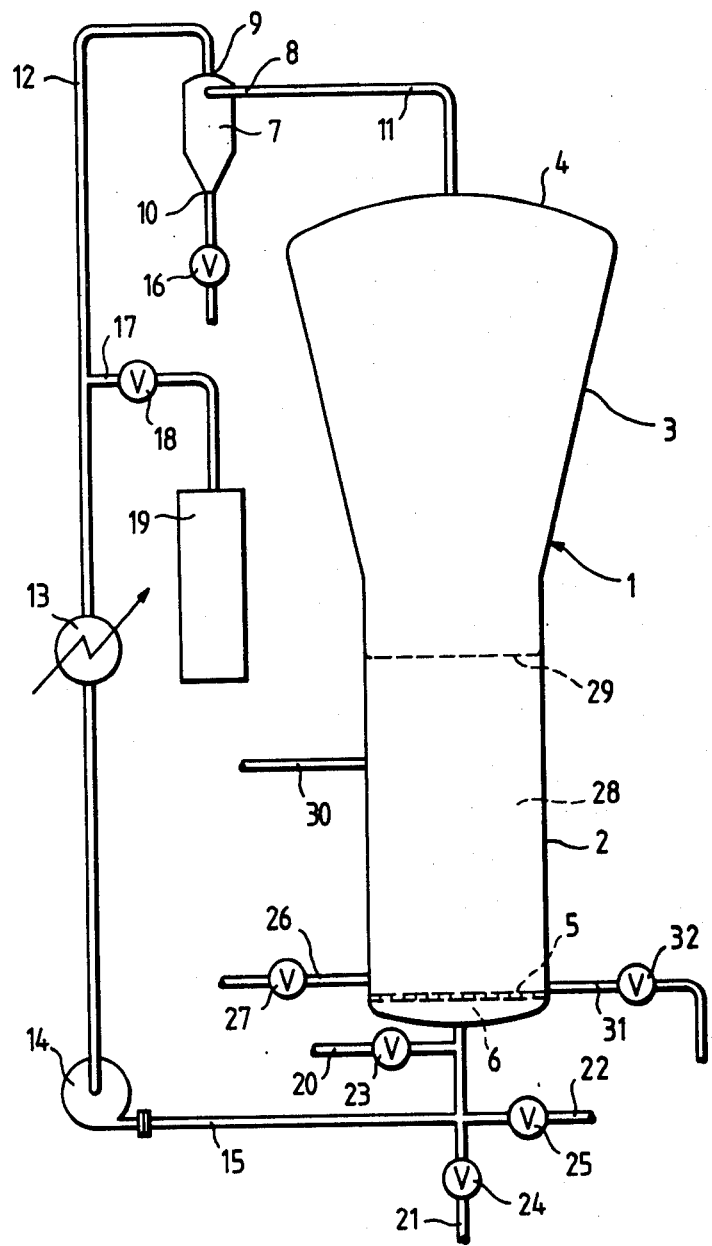
FIG. 1 is a flow diagram of an apparatus incorporating a fluidised bed reactor vessel and a recycle gas loop.

In FIG. 1 of the accompanying drawings, a fluidised bed reactor 1 has a lower cylindrical section 2, an upper inverted conical section 3 and a domed top 4. At the bottom of the reactor 1 is located a gas distribution plate 5, which may be a perforated metal plate, and beneath the plate 5 is located a gas distribution chamber 6.

A cyclone 7 is positioned outside the reactor 1. The cyclone 7 has a tangential side inlet 8, a top outlet 9 and a bottom outlet 10. A conduit 11, which connects with the interior of the reactor 1, is fixed to the top 4 of the reactor 1 and is also connected with inlet 8 of the cyclone 7. The outlet 9 is connected to a conduit 12 which is connected to a recycle system represented by a recycle gas cooler 13, a pump 14 and a conduit 15 which leads to the gas distribution chamber 6. The outlet 10 is provided with a valve means 16.

A sample line 17, which includes a valve means 18, leads from the conduit 12 to a gas chromatography column 19. Conduits 20, 21 and 22, each of which is connected to the conduit 15 and provided with a flow control valve 23, 24 and 25 respectively, are also connected respectively to sources (not shown), of ethylene, hydrogen and ethane. A conduit 26, which communicates with the interior of section 2 of the reactor 1, is provided with a flow control valve 27 and is also connected to a source (not shown) of comonomer (for example hexene-1). Within section 2 of the reactor 1 there is a bed 28 of fluidised solid particles, the upper surface of which is indicated at 29. A conduit 30 communicates with the interior of section 2 of the reactor 1 and is also connected to a source of a polymerisation catalyst or polymerisation catalyst component. A solids off-take conduit 31, provided with a valve means 32, communicates with section 2 of the reactor 1 at a position just above the gas distribution plate 5.

Figure 2:
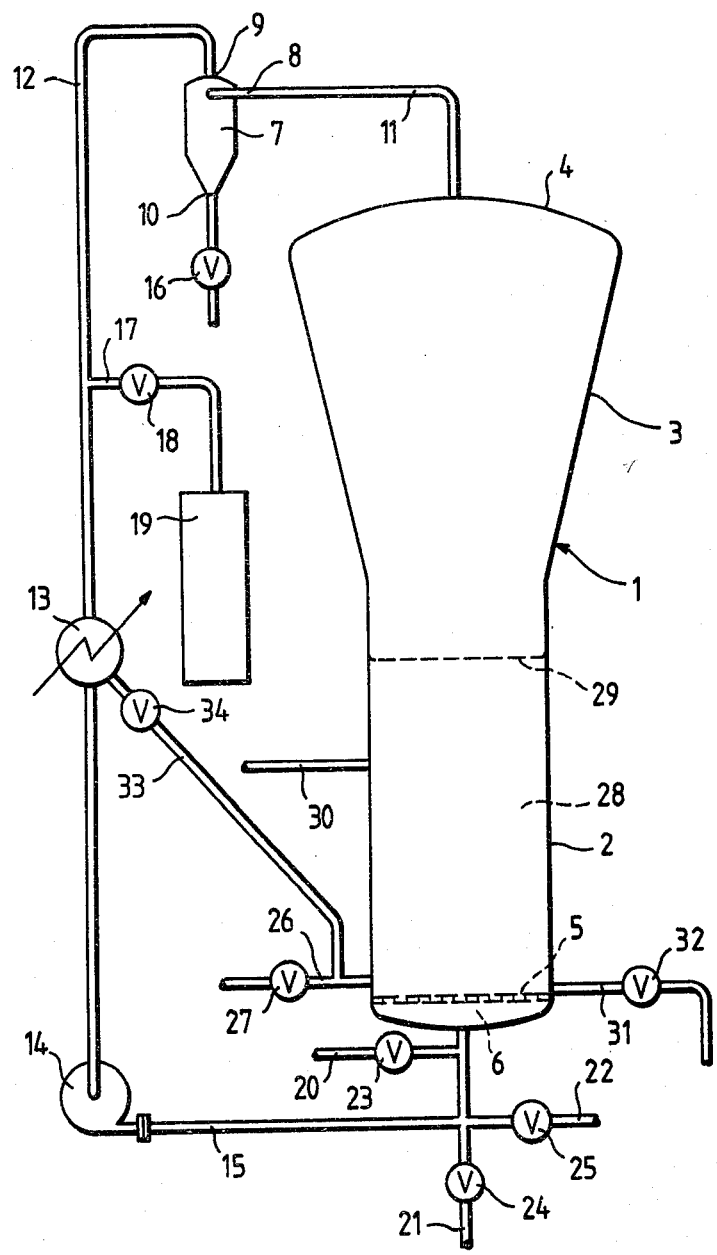
FIG. 2 is a flow diagram of a modified apparatus.

In FIG. 2 of the accompanying drawings, a conduit 33, which is provided with a flow control valve 34, connects the recycle gas cooler 13 to the conduit 26 for make-up comonomer.

In the arrangement shown in FIG. 1, a gas mixture is passed into section 2 of the reactor 1 at a rate sufficient to cause fluidisation of the bed 28. Comonomer is added through conduit 26 at a rate to give a desired gas composition within the reactor. The comonomer is typically added as a liquid and rapidly evaporates under the polymerisation conditions within the reactor 1. The unreacted gas is removed from the reactor through conduit 11 and solid particles contained in the gas stream are at least partially removed in the cyclone 7. The gas mixture passes through conduit 12 to the gas cooler 13 where it is cooled to a suitable temperature such as 40° C. The cool gas mixture is then recycled to the reactor by means of the pump 14 and conduit 15.

Samples of the circulating gas are removed through the sample line 17 by intermittent operation of the valve means 18, and the sample is analysed by the gas chromatography column 19. From the results of the analysis of the gas sample, appropriate adjustments are made to one or more of the valves 23, 24, 25 and 27. A catalyst, or catalyst component, is introduced into the bed 28 through the conduit 30. If the catalyst contains several components, these may be premixed and the total catalyst system added through the conduit 30 or the catalyst components may be added separately. If the catalyst components are added separately, it is preferred that at least one component is added directly to the bed 28 through the conduit 30 and the other components may be added directly to the bed 28 through other conduits (not shown) or, if these other components are volatile, they may be introduced into the gaseous mixture and pass into the reactor with the fluidising gas.

Polymer is withdrawn intermittently, or continuously, from the bed 28 by means of the conduit 31 and valve 32.

The operation of the apparatus shown in FIG. 2 is essentially the same as the operation of the apparatus of FIG. 1 with the exception that the recycle gas cooler 13 causes condensation of some of the gas mixture which is being recycled. Essentially all of the material condensed is the comonomer. The amount of condensed material is typically less than 1% by weight of the gas mixture. The condensed material is withdrawn from near the base of the recycle gas cooler 13 through conduit 33 and valve 34 and passed to the conduit 26 and thence introduced, together with make-up comonomer, into section 2 of the reactor 1. (In operation of a commercial plant, about 40 kilotonnes per annum, this would represent 5 tonnes/hour of liquid comonomer, make-up and recycle, added to the polymerisation vessel).

Other alternative polymerisation systems will be apparent to the skilled worker and may be used without departing from the scope of the present invention as defined herein.

Various aspects of the present invention will now be described with reference to the following Examples which are illustrative of the invention. In the Examples, and the catalyst preparations, all operations are effected under an atmosphere of essentially oxygen- and water-free nitrogen unless otherwise indicated. All glass apparatus was dried in an air oven at 120° C. for at least one hour and purged with nitrogen before use.

PREPARATION OF CATALYST A

This catalyst was prepared in accordance with the procedure generally described in European patent application publication No. 14523.

(I) Reaction with silica and magnesium dibutyl

A sample of silica having a high specific surface area (Davison 952 grade obtainable from W. R. Grace and Company of Md. USA) was heated up to 350° C. under a stream of nitrogen at atmospheric pressure, maintained at 350° C. for two hours and then allowed to cool, in the oven, to ambient temperature.

146.4 g of the silica dried as described previously were suspended in an isoparaffin fraction having a boiling temperature range of 117° C. to 135° C. (hereafter referred to as the "isoparaffin fraction") in a two dm$^3$ reaction vessel provided with a vapour jacket and a stirrer. Sufficient of the isoparaffin fraction was used to provide a mixture of one dm$^3$ volume The mixture was stirred and 500 cm$^3$ of a 0.59 M solution of magnesium dibutyl (an equimolar mixture of primary and secondary dibutyl magnesium) in the isoparaffin fraction were added to the suspension. The mixture was then stirred at ambient temperature (about 20° C.) for four hours. The stirring was stopped and the solid was allowed to settle. The supernatant liquid was then removed, the solid was washed twice using one dm$^3$ of the isoparaffin fraction at ambient temperature for each wash. Sufficient of the isoparaffin fraction at ambient temperature was then added to give a volume of 1380 cm$^3$.

(II) Treatment with silicon tetrachloride

To the mixture from step (I) were added 720 cm$^3$ of silicon tetrachloride. This mixture was stirred and heated gently up to reflux temperature (about 80° C.) and stirred at that temperature for a further three hours. The mixture was then allowed to cool and settle overnight. The mixture was then stirred and heated up to 80° C. once more, maintained at 80° C. for one hour and then allowed to settle and cool to ambient temperature. The supernatant liquid was removed and the solid was washed five times using 1450 cm$^3$ of the isoparaffin fraction at ambient temperature for each wash. After the final wash, the supernatant liquid was removed to give a volume of about 800 cm$^3$.

(III) Treatment with ethyl benzoate

To the concentrated suspension from step (II) were added 16.8 cm$^3$ of ethyl benzoate, the mixture was stirred at ambient temperature for 3.5 hours and allowed to settle overnight. The supernatant liquid was then removed to give a volume of about 600 cm$^3$ and the solid was washed five times using 1200 cm$^3$ of the isoparaffin fraction at ambient temperature for each wash. After the final wash, the supernatant liquid was removed to give a volume of about 600 cm$^3$.

(IV) Treatment with titanium tetrachloride

To the concentrated suspension from step (III) were added 1500 cm$^3$ of titanium tetrachloride, the mixture was stirred, heated to 80° C. and maintained at that temperature for four hours. The mixture was allowed to settle without cooling and the supernatant liquid was removed to give a volume of 600 cm$^3$. The solid was then washed five times using 1200 cm$^3$ of the isoparaffin fraction at 80° C. for each wash. A further five washes were effected using 1200 cm$^3$ of the isoparaffin fraction at ambient temperature for each wash. The mixture was finally diluted to a volume of 1500 cm$^3$ by the addition of the isoparaffin fraction at ambient temperature. The diluted mixture was transferred to a vessel having a sinter base and was allowed to settle over the weekend. The mixture was filtered and the solid partly dried by suction. The damp solid remaining was dried in the reaction vessel at a pressure of about 0.3 kN/m$^2$ for four hours at 60° C.

PREPARATION OF CATALYST B

This catalyst was prepared in accordance with the general procedure of our published British patent application publication No. 2103627, entitled "Transition Metal Composition, Production and Use".

(I) Milling magnesium chloride and ethyl benzoate

A Siebtechnik SM10 Vibromill having a total volume of about 38 dm$^3$ and containing 119 kg of stainless steel balls of 25 mm diameter was sealed and purged with nitrogen to give a nitrogen atmosphere in the mill. A mixture of water and ethylene glycol at 0° C. was passed through the jacket of the mill and the mill was vibrated at a frequency of 1500 oscillations per minute and an amplitude of 2 mm. Four kilogrammes of essentially anhydrous magnesium chloride (BDH technical grade) were introduced into the mill whilst the mill was being vibrated. After the addition of the magnesium chloride, the mill was vibrated for about 15 minutes and 2 dm$^3$ of ethyl benzoate were added to the vibrating mill over a period of about 15 minutes. The mill was then vibrated for a further 24 hours whilst continuing to pass the mixture of water and ethylene glycol at 0° C. through the jacket of the mill.

After 24 hours, the mill was inverted, the inverted mill was vibrated and the milled magnesium chloride-ethyl benzoate was collected under nitrogen. The molar ratio of magnesium chloride to ethyl benzoate in the mill was about 3 to 1.

(II) Contacting with titanium tetrachloride

A sample (500 grammes) of the milled product from step (I) was transferred to a 6 dm$^3$, jacketted glass vessel which was provided with a stirrer. Four dm$^3$ of titanium tetrachloride were added to the vessel, the stirrer was started and heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. Three hours after terminating the stirring, the supernatant liquid was siphoned off from the settled solid. The heating was switched off and the settled solid allowed to cool overnight.

The contacting with the titanium tetrachloride was repeated by adding four dm$^3$ of titanium tetrachloride to the cold residue remaining from the previous contacting, the conditions of treatment being as previously described. The settled solid was allowed to cool overnight.

(III) Washing

To the residue remaining from step (II) was added an aliphatic hydrocarbon mixture consisting essentially of dodecane isomers and having a boiling point essentially in the range 170° to 185° C. (hereafter referred to as the "aliphatic hydrocarbon"). The aliphatic hydrocarbon was added at ambient temperature in a sufficient quantity to give a total volume of six dm$^3$. The mixture was stirred and heated up to 100° C. Stirring at 100° C. was continued for an hour and the stirrer was then stopped. After three hours, the supernatant liquid was siphoned off from the settled solid, which was still being heated. The heating was switched off and the solid allowed to cool overnight.

The procedure of the first washing step was repeated but the solid was allowed to cool for only 1.5 hours.

To the residue remaining from the previous washing step, a sufficient quantity of the aliphatic hydrocarbon at ambient temperature was added to give a total volume of six dm$^3$. The mixture was stirred for 10 minutes without heating and allowed to settle overnight. The cold supernatant liquid was then siphoned off.

The procedure of the previous cold washing step was repeated with the exception that the solid was allowed to settle for 3.5 hours and the supernatant liquid was then siphoned off.

The cold residue remaining from the washing steps was diluted with the aliphatic hydrocarbon at ambient temperature to give a final volume of 1.5 dm$^3$ and the mixture was transferred to a 2 dm$^3$ storage vessel under nitrogen.

(IV) Spray drying

The suspension obtained in step (III) was allowed to settle and the supernatant liquid siphoned off. Toluene at ambient temperature was added to give a final volume of 1.5 dm$^3$, the mixture was stirred for ten minutes and allowed to settle. The supernatant liquid was siphoned off. The mixture was diluted to a solid content of 30% by weight relative to the weight of the mixture by the addition of toluene and a 10% weight/volume solution of polystyrene ("Styron" 686/7 - available from Dow Chemical Company) in toluene, the polystyrene solution being added to provide 2.5% by weight of polystyrene relative to the solid.

The suspension obtained as described was spray dried using a glass laboratory scale spray-drying apparatus similar to that illustrated in FIG. 4 of European patent application publication No. 37182. The spray-drying apparatus had a diameter of 15 cm, a length of 0.7 meters and a generally hemispherical bottom section. A conduit from the bottom section was connected directly to a cyclone provided with a catch-pot in which the solid material was collected. The conduit 17 was omitted. A spray nozzle was located at the bottom of the apparatus and this was a ⅛ JAU Automatic Air Atomizing Nozzle obtained from Spraying Systems Co. of the USA and having a 0.75 mm diameter nozzle.

Spraying was effected under nitrogen by passing a stream of nitrogen, preheated to a temperature of 135°–140° C., into the spray-drying apparatus at a rate of 190 dm$^3$/minute. Nitrogen at a pressure of about 140 kN/m$^2$ absolute was introduced into the spray nozzle. The suspension was stirred and was fed from the storage flask to the spray nozzle by the application of an excess nitrogen pressure of 6.7 kN/m$^2$ to the storage flask.

EXAMPLES 1 TO 10

A 20 cm internal diameter fluidised bed reactor vessel, operated in a continuous manner, was used to produce a series of ethylene copolymers. A reaction mixture comprising ethylene, comonomer, inert gaseous diluent and hydrogen was circulated continuously through the bed at a superficial velocity estimated to be about four times the minimum necessary for fluidisation. In the fluidised bed, the reaction temperature was controlled at a desired temperature by adjusting the temperature of the gas fed to the fluidised bed reactor vessel using a gas cooler in the circulating gas loop. An aluminium trialkyl was pumped continuously into the reactor as a 0.25 molar solution in n-hexane or n-heptane. Catalyst A or catalyst B was blown into the reactor as a dry powder in a stream of process gas at frequent intervals so as to maintain a rate of polymer production of about 1.5 Kg/hr, which corresponds to a mean residence time of three hours. The reaction pressure was maintained automatically by admitting an ethylene/hydrogen mixture through a control valve. Liquid comonomer was pumped into the circulating gas stream so as to maintain a constant composition as determined by Gas Liquid Chromatography.

The polymer formed was removed periodically so as to maintain an essentially constant level in the reactor vessel. The polymer collected was degassed in a stream of nitrogen which had been passed over a bath of water at ambient temperature, and then through a steam jacket. The use of this warm, moist nitrogen removed monomers and also de-activated the catalyst and alkyl residues.

Details of the catalyst system and gas composition are set out in Table One.

Details of the polymerisation conditions, together with some characteristics of the polymers obtained, are set out in Table Two.

TABLE ONE

| Ex or Comp (a) | Ti Comp. Type (b) | Ti Comp. Rate (cm$^3$/hr) (c) | Alkyl Rate (cm$^3$/hr) (d) | Gas Composition Mole % (e) | | | | | |
|---|---|---|---|---|---|---|---|---|---|
| | | | | Eth | Hy | Comonomer Type | Comonomer Amount | Inert Gas Type | Inert Gas Amount |
| 1 | A | 1.2 | 50* | 84 | 8 | H | 8 | Nil | Nil |
| 1 | A | 0.8 | 50 | 45.2 | 9.5 | H | 4.6 | N | 40.7 |
| 2 | A | 1.7 | 50 | 22.3 | 5.5 | H | 1.8 | N | 70.4 |
| 3 | A | 1.0 | 50 | 37.1 | 6.1 | H | 3.1 | N | 53.7 |
| 4 | B | 0.7 | 50** | 35.1 | 7.1 | H | 3.6 | N | 54.2 |
| 5 | A | 3.0 | 130** | 37.2 | 5.6 | H | 3.6 | E | 53.6 |
| 6 | B | 0.2 | 50** | 37.3 | 7.2 | H | 3.6 | E | 51.8 |
| 7 | A | 1.2 | 30** | 27.4 | 4.4 | MP | 7.6 | E | 60.6 |
| 8 | A | 1.2 | 25** | 19.7 | 3.3 | MP | 6.3 | N | 70.7 |
| 9 | A | 0.8 | 50** | 21.6 | 4.8 | O | 0.24 | N | 73.4 |

TABLE ONE-continued

| Ex or Comp (a) | Ti Comp. Type (b) | Ti Comp. Rate (cm³/hr) (c) | Alkyl Rate (cm³/hr) (d) | Gas Composition Mole % (e) | | | | | |
|---|---|---|---|---|---|---|---|---|---|
| | | | | Eth | Hy | Comonomer Type | Comonomer Amount | Inert Gas Type | Inert Gas Amount |
| 10 | A | 0.8 | 50** | 20.1 | 8.0 | O | 0.31 | N | 71.6 |

Notes to Table One
(a) Comparative Examples are indicated by Roman Numerals.
(b) A and B indicate catalysts A and B respectively.
(c) The titanium composition is added as a solid using a solid metering device of known volume capacity.
(d) The volume of the 0.25 molar aluminium trialkyl solution added during each hour.
*In this run, the aluminium trialkyl was aluminium trioctyl; in all the other runs aluminium triethyl was used.
**In these runs, the aluminium trialkyl was added as a solution in n-heptane, in the remaining runs the solvent was n-hexane.
(e) Eth is ethylene
Hy is hydrogen
H is hexene-1
MP is 4-methylpentene-1
O is octene-1
N is nitrogen
E is ethane.

TABLE TWO

| Ex or Comp (a) | Reaction Conditions Pressure (MN/m² absolute) | Reaction Conditions Temp (°C) (f) | Polymer MFI (dl/g) (h) | Polymer density (kg/m³) (i) | Rate of Polymer Production (kg/hr) (j) | Co-monomer Content (wt %) (k) |
|---|---|---|---|---|---|---|
| I | 0.86 | 80 | 2.0 | 919 | 1.2 | 6.7 |
| 1 | 1.48 | 80 | 1.1 | 919.6 | 1.8 | 7.3 |
| 2 | 1.48 | 80 | 1.1 | 919.1 | 1.4 | 7.0 |
| 3 | 1.48 | 90 | 1.0 | 920.5 | 1.6 | 7.3 |
| 4 | 1.48 | 80 | 1.2 | 920.1 | 1.6 | 8.8 |
| 5 | 1.48 | 80 | 1.1 | 920.1 | 4.8 | 7.6 |
| 6 | 1.48 | 80 | 1.0 | 920.7 | 1.6 | 6.7 |
| 7 | 1.48 | 80 | 1.1 | 920 | 1.3 | ND |
| 8 | 1.48 | 80 | 1.1 | 919.5 | 1.2 | ND |
| 9 | 1.48 | 80 | 0.8 | 924.8 | 1.0 | 6.9 |
| 10 | 1.48 | 90 | 3.4 | 923.4 | 1.2 | ND |

Notes to Table Two
(a) is as defined in Notes to Table One.
(f) the reaction temperature within the polymerisation vessel.
(h) MFI is the melt flow index measured by ASTM Method D 1238-70 at 190° C. using a 2.16 kg weight.
(i) Polymer density was measured as described in ASTM 1928/70 Method A, using a density gradient column at 23° C.
(j) This is the rate at which polymer is removed from the reactor vessel in order to maintain an essentially constant level in the reactor vessel.
(k) Measured using infra-red techniques using a mathematical comparison of the absorbance curve from 1310 to 1430 cm⁻¹ with two standard polyethylenes of known methyl count and making a correction for methyl groups which are the ends of molecules.

In the polymerisation of Comparative Example I, it was found to be difficult to maintain steady reaction conditions. Furthermore, lump formation occurred and the lumps necessitated frequent shut-down of the reactor. Observation of the fluidised bed showed that on occasions violent bubble bursts occurred which increased the possibility of polymer carry-over from the reactor and, at other times, the bed was difficult to fluidise.

In the polymerisations of Examples 1 to 10, there were few problems in maintaining steady reaction conditions and less lump formation occurred, thus allowing longer polymerisation times. The bubble bursts were less violent.

Several of the copolymers prepared as described in Examples 1 to 10 were formed into film using an upwardly extruding laboratory, tubular film extrusion unit, having a dual lip air ring supplied with chilled air to cool the bubble. The polymers were pelletised by extrusion and lace cutting prior to filming. No additives were incorporated into the polymers.

The extruder had a 45 mm diameter screw, with a length to diameter ratio of 25:1 and was operated at melt and die temperatures of 220° C. The die was of 75 mm diameter and had an annular die gap of 2 mm. The film was blown to give a circumferential expansion of 2:1 or 3:1 and films of 30 microns thickness were produced. The unit was operated at a rate of 15 kg/hour. In Table Three are set out some of the processing conditions and in Table Four are set out some of the properties of the films produced.

TABLE THREE

| Polymer type (l) | Blow ratio (m) | Screw speed (rpm) | Melt pressure (MN/m²) | Motor current (amps) | Haul off Rate (m/min) | Freeze line distance (mm) | Lay flat width (mm) |
|---|---|---|---|---|---|---|---|
| 5 | 2 | 60 | 900 | 12 | 20 | 170 | 236 |
| 5 | 3 | 60 | 900 | 12 | 14 | 190 | 350 |
| 6 | 2 | 66 | 1000 | 12 | 20 | 170 | 236 |
| 7 | 2 | 44 | 1100 | 15 | 22 | 170 | 236 |
| 7 | 3 | 44 | 1100 | 15 | 16 | 170 | 350 |
| 8 | 2 | 66 | 900 | 12 | 20 | 170 | 236 |
| 8 | 3 | 66 | 900 | 12 | 14 | 180 | 350 |

Notes to Table Three
(l) Polymer Type refers to the product of one of Examples 5 to 8.
(m) Blow ratio is the circumferential expansion achieved on blowing the extrudate.

TABLE FOUR

| Film Type (n) | Haze (%) (o) | Gloss (p) | Impact (g) (q) | Tear Strength (r) (KN/m) MD (s) | Tear Strength (r) (KN/m) TD (s) | Tensile Strength (t) (MN/m²) Yield MD (s) | Tensile Strength (t) (MN/m²) Yield TD (s) | Tensile Strength (t) (MN/m²) Break MD (s) | Tensile Strength (t) (MN/m²) Break TD (s) | Elongation to break (%) (u) MD (s) | Elongation to break (%) (u) TD (s) |
|---|---|---|---|---|---|---|---|---|---|---|---|
| 5/2 | 12.3 | 47 | 88 | 31 | 208 | 12.5 | 13.4 | 65.8 | 40.5 | 440 | 830 |
| 5/3 | 14.8 | 41 | 190 | 60 | 146 | 11.6 | 12.7 | 55.5 | 43.7 | 590 | 790 |
| 6/2 | 16.5 | 38 | 60 | 14 | 238 | 14.3 | 15.3 | 81.5 | 43.8 | 390 | 880 |
| 7/2 | 12.7 | 45 | 85 | 20 | 164 | 12.9 | 15.1 | 68.5 | 46.9 | 490 | 880 |

TABLE FOUR-continued

| Film Type (n) | Haze (%) (o) | Gloss (p) | Impact (g) (q) | Tear Strength (r) (KN/m) | | Tensile Strength (t) (MN/m²) | | | | Elongation to break (%) (u) | |
|---|---|---|---|---|---|---|---|---|---|---|---|
| | | | | | | Yield | | Break | | | |
| | | | | MD (s) | TD (s) | MD (s) | TD (s) | MD (s) | TD (s) | MD (s) | TD (s) |
| 7/3 | 14.5 | 40 | 130 | 22 | 161 | 12.8 | 15.1 | 61.3 | 48.5 | 560 | 830 |
| 8/2 | 15.7 | 40 | 58 | 11 | 234 | 12.4 | 14.1 | 59.0 | 38.5 | 400 | 880 |
| 8/3 | 17.3 | 35 | 140 | 38 | 133 | 12.3 | 13.9 | 50.8 | 40.5 | 490 | 780 |

Notes to Table Four
(n) The first number refers to the Polymer Type, as defined in Note (1) to Table Three and the second number refers to blow ratio, as defined in Note (m) to Table Three.
(o) % Haze is determined as described in ASTM Method D 1003-61 using a pivotable sphere haze meter.
(p) Gloss is measured as specular reflectivity at an angle of 45° as described in ASTM Method D 2457-70.
(q) Impact strength was measured according to British Standard 2782, 1970, Method 306F.
(r) Determined according to British Standard 2782; 1970 Method 308B.
(s) MD means Machine Direction. TD means Transverse Direction.
(t) and (u) Tensile measurements on the films were carried out and on specimens 10 mm wide by the method described in ISO Recommendation 1184, 1970, at a straining rate of 500 mm per minute.

I claim:

1. A process for the preparation of a copolymer of ethylene which comprises contacting, in a polymerisation vessel, a gaseous mixture with a solid medium containing an olefin polymerisation catalyst, wherein the gaseous mixture comprises ethylene, at least one olefin comonomer containing at least 4 carbon atoms, at least one inert gaseous diluent and optionally hydrogen, wherein, within the polymerisation vessel, the partial pressure of the comonomer or comonomers containing at least 4 carbon atoms is such as to be greater than the saturated vapour pressure of the comonomer or comonomers at 10° C. and less than the saturated vapour pressure of the comonomer or comonomers at 60° C., the partial pressure of the ethylene is at least twice and not more than 1000 times the partial pressure of the comonomer, or comonomers, the partial pressure of the optional hydrogen is up to 1000 times the partial pressure of the comonomer, or comonomers, and the inert gaseous diluent is present in an amount to give a total pressure of at least one MN/m² absolute.

2. The process of claim 1 wherein the partial pressure of hydrogen is from 0.5 up to 50 times the partial pressure of the comonomer or comonomers.

3. The process of claim 1 wherein the partial pressure of the inert gaseous diluent is at least 350 kN/m².

4. The process of claim 1 wherein the inert gaseous diluent forms at least 20% by moles of the gaseous mixture.

5. The process of claim 4 wherein the amount of the inert gaseous diluent does not exceed 85% by moles of the gaseous mixture.

6. The process of claim 1 wherein the gaseous mixture comprises ethylene; hexene-1, 4-methylpentene-1 or octene-1; hydrogen and ethane.

7. The process of claim 1 wherein the total pressure of the gaseous mixture is at least 1.30 GN/m² absolute and not more than 5.0 GN/m² absolute.

8. The process of claim 1 wherein the olefin polymerisation catalyst is a catalyst system which comprises a transition metal compound together with an organic compound of a non-transition metal; an oxide of chromium on a support material; or an organic compound of a transition metal on a support material.

9. The process of claim 8 wherein the olefin polymerisation catalyst includes a component obtained by reacting an organic magnesium compound with a support material, and subsequently treating this with an optional halogen-containing compound, an optional Lewis Base compound and with a transition metal compound.

10. The process of claim 8 wherein the olefin polymerisation catalyst includes as one component, the product of contacting a transition metal compound, with a magnesium halide.

* * * * *